(12) United States Patent
Miles

(10) Patent No.: US 7,729,032 B2
(45) Date of Patent: Jun. 1, 2010

(54) NON-IMAGING CONCENTRATING OPTIC DESIGN WITH MODULATOR

(76) Inventor: Mark W Miles, Bldg. 43, Fort Mason, San Francisco, CA (US) 94123

( * ) Notice: Subject to any disclaimer, the term of this patent is extended or adjusted under 35 U.S.C. 154(b) by 385 days.

(21) Appl. No.: 11/390,875

(22) Filed: Mar. 28, 2006

(65) Prior Publication Data
US 2006/0245090 A1 Nov. 2, 2006

Related U.S. Application Data

(60) Provisional application No. 60/666,815, filed on Mar. 31, 2005.

(51) Int. Cl.
*G02B 26/08* (2006.01)
*G02B 26/00* (2006.01)
(52) U.S. Cl. .......... 359/237; 359/223.1; 359/900
(58) Field of Classification Search .......... 359/726, 359/223.1, 237, 838, 900
See application file for complete search history.

(56) References Cited

U.S. PATENT DOCUMENTS 6,671,452 B2 * 12/2003 Winston et al. .......... 385/146
7,006,306 B2 * 2/2006 Falicoff et al. .......... 359/800

* cited by examiner

*Primary Examiner*—William C Choi
*Assistant Examiner*—Jack Dinh
(74) *Attorney, Agent, or Firm*—Hahn and Moodley LLP; Vani Moodley, Esq

(57) ABSTRACT

In one embodiment the invention provides a device for modulating light. The device includes a non-imaging concentrating optic having a body with a first end through which light enters the body and a second end through which light leaves the body; and a shutter component which can be selectively aligned with the second end in one of several operative positions wherein in at least one operative position, the shutter component is sufficiently close to the second end of the body to be within the wavelength of an evanescent wave generated at a surface of the body at the second end when total internal reflection occurs at the surface.

15 Claims, 6 Drawing Sheets

402  404  406

NON-IMAGING CONCENTRATING OPTIC DESIGN WITH MODULATOR

RELATED APPLICATIONS

This application claims the benefit of priority to U.S. Application No. 60/666,815, which was filed on Mar. 31, 2005, which application is hereby incorporated by reference.

FIELD OF THE INVENTION

Embodiments of this invention relate to optical devices in general, and to display devices in particular.

BACKGROUND

The compound parabolic concentrator, CPC, is a form of a non-imaging concentrating optic ie. a family of optical components that concentrate light without forming an image. CPCs are described and documented in the text "Nonimaging Optics" by Roland Winston, et al hereby incorporated by reference. The CPC has a variety of applications ranging from solar energy collection, to flat panel displays, for example like that described in patent application U.S. 60/659,498, which is hereby incorporated by reference.

The "collection angle" refers to the range of angles from which light enters a CPC and is able to successfully exit the CPC without being reflected due to total internal reflection (TIR). One issue of CPC design that is relevant to all of these applications is that it is desirable to increase the collection angle. For solar energy applications, an increase in the collection angle can increase the efficiency of the system. For flat panel displays, viewing angle, contrast ratio, and overall brightness can be improved as a result of increasing the collection angle

SUMMARY

According to one aspect of the Invention, there is provided a method of increasing the collection angle of a non-imaging concentrating optic such as a CPC by decreasing the angle at which the light propagates through a body of the non-imaging concentrating optic. Decreasing the angle at which the light propagates through the body may be by changing the refractive index of a medium that defines the body. In one embodiment, refractive index may be changed by using a dielectric material for the medium According to another aspect of the invention, there is provided a method of controlling total Internal reflection by a surface defining an exit aperture for a non-imaging concentrating optic such as a CPC. The method Includes treating the surface to at least reduce total internal reflection by the surface thereby allowing light to escape from the non-imaging concentrating optic through the exit aperture. In one embodiment, treating the surface may include roughening the surface. Roughening the surface may be by etching or depositing an irregular pattern on the surface so that the normally smooth surface has randomly orientated edges. The edges may have a length of between 1/10 the wavelength of light to several microns. In one embodiment, treating the surface may include etching the surface so that the refractive index seen by light traveling through a medium of the non-imaging concentrating optic decreases as the light approaches the surface. The etched surface may have a refractive index matched to that of air, in one embodiment.

According to another embodiment of the invention, the optical surface of the material defining the exit aperture of a non-imaging concentrating optic may be provided with an anti-reflective coating. The anti-reflective coating may be a continuous dielectric coating in the form of a single optical film layer or a stack of optical films. The single optical film may include a film having a thickness that is an odd multiple of a quarter wavelength of light. The refractive index of the single optical film may be around the square root of that of the material of the non-imaging concentrating optic.

According to another aspect of the invention, there is provided a device for modulating light, which includes a non-imaging concentrating optic having a body with a first end through which light enters the body and a second end through which light leaves the body; and a shutter component which can be selectively aligned with the second end in one of several operative positions wherein in at least one operative position, the shutter component is sufficiently close to the second end of the body to be within the wavelength of an evanescent wave generated at a surface of the body at the second end when total internal reflection occurs at the surface. In one embodiment, the shutter component may be in physical contact with the surface of the body at the second end when in the operative position.

According to another aspect of the invention, there is provided a device for modulating light, which includes a non-imaging concentrating optic having a body of a dielectric medium with a first end through which light enters the body and a second end through which light leaves the body, the second end having a surface that is adapted to allow light to escape therethrough. The surface may adapted by roughening to promote transmission of light therethrough and to at least reduce reflection. The surface may be adapted by having a dielectric coating to promote the transmission of light through the surface.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the invention disclose techniques to increase the collection angle of a non-imaging concentrating optic such as a CPC. Embodiments of the invention also disclose a non-imaging concentrator, in the form of a CPC, with a light extracting surface treatment applied to Its exit aperture to promote transmission of light through the exit aperture thereby to at least reduce total internal reflection. In another embodiment a CPC may be integrated with a movable shutter wherein the shutter Is optically coupled with the CPC when in an active state. In yet another embodiment, the CPC and integrated shutter are not optically coupled, but the CPC Is adapted to transmit light thorough its exit aperture.

Figure 1:
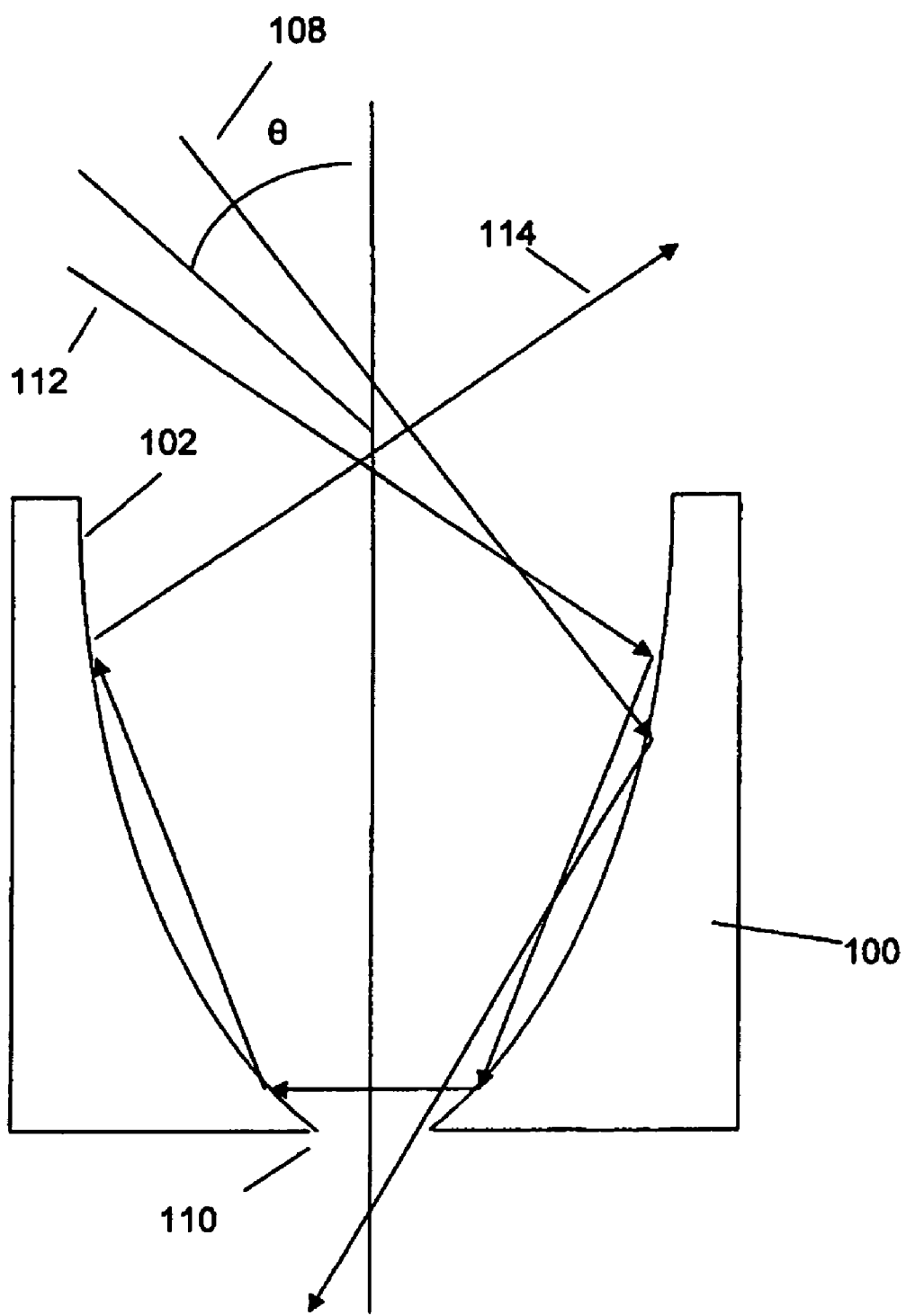
FIG. 1 of the drawings shows a CPC design that uses a material with a refractive index of 1.

Referring to now FIG. 1 of the drawings, a side view of a CPC 100 is shown. The CPC may be fabricated from one or more materials, such as plastics or metals as long as an interior surface 102 of the CPC 100 is optically smooth. The interior surface 102, of the CPC may be coated with a suitable metal such as aluminum or silver so that the Interior surface 102 is reflective. The index of refraction of the CPC medium through which light travels is I in the case of the CPC 100, since the CPC 100 is an air-filled structure. In general, the CPC 100 accepts light that is incident within a collection angle θ, and directs it towards exit aperture 110: Incident ray 108 Is an example of one ray which falls within the collection angle. For light which is incident outside of the collection angle, the sidewalls of the CPC are shaped in a fashion the light is generally reflected at an angle which Is the opposite of the entry angle as is illustrated by incident ray 112 which exits as ray 114. The consequence of this is that only light falling within the collection angle can be acted on by devices resident at exit aperture 110.

Figure 2:
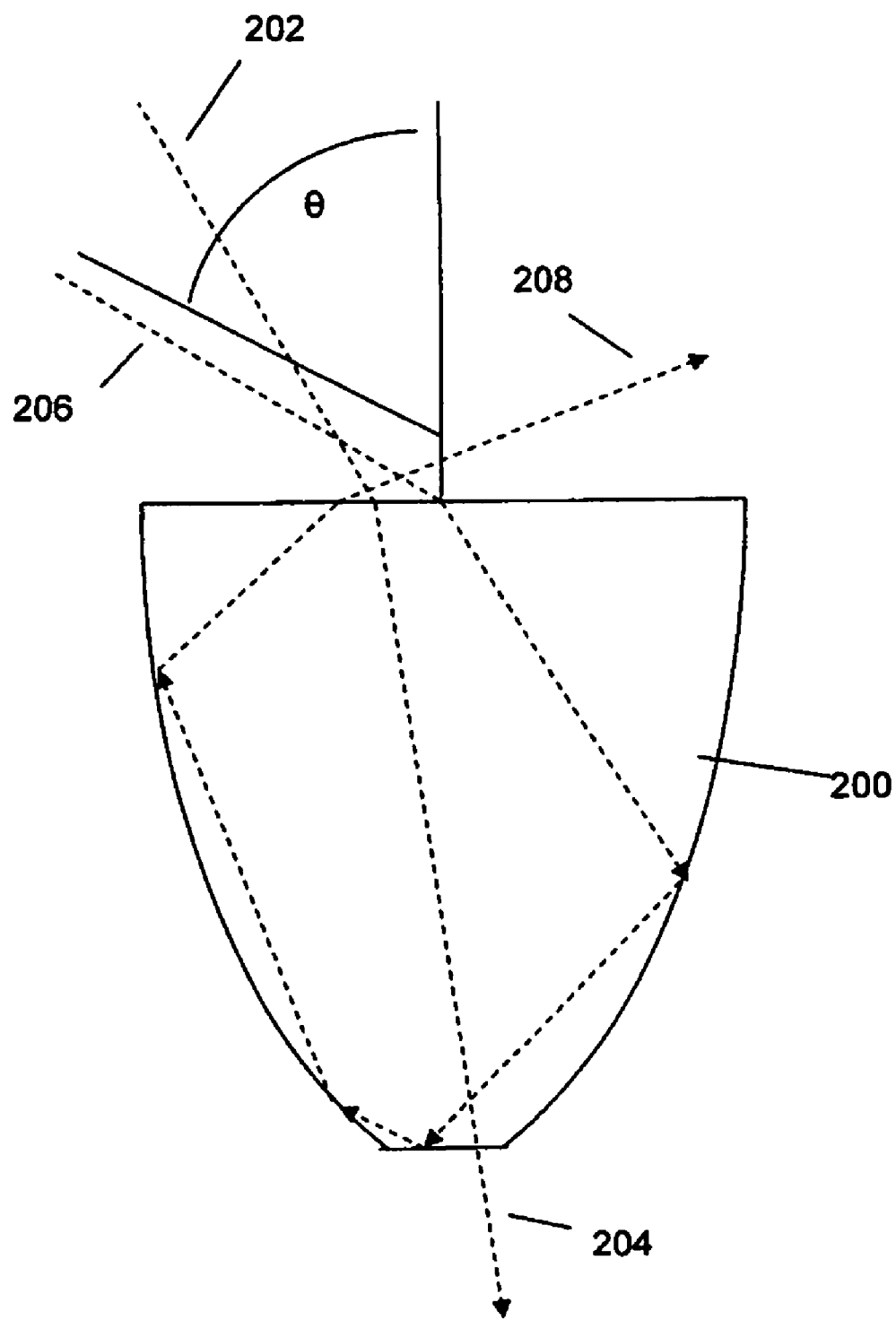
FIG. 2 of the drawings shows a CPC design that uses a material with a refractive index of >1, in accordance with one embodiment of the invention.

In accordance with one embodiment of the invention, the collection angle is increased to an effective collection angle by changing the index of refraction of the CPC medium. Referring to FIG. 2 of the drawings, an alternative CPC design 200 is shown. In the case of the CPC design 200, the CPC is no longer hollow-form as was the case with CPC 100, but instead Is of a dielectric material. The dielectric material may be a transparent material such as plastic (polycarbonate or PMMA for example) or glass. Because of the phenomena of light refraction, light incident on the CPC 200 at one angle propagates through the body of the CPC 200 at a smaller angle, and according to Snell's Law $n_1 \sin(\theta_1) = n_2 \sin(\theta_2)$. In this equation $\theta_1$ and $\theta_2$ refer to incident angle and the propagation angle and, and $n_2$ refer to the index of refraction of the incident medium (air in this case) and the medium of propagation (plastic for example).

This modification comes with at least two consequences. The positive one, from an operational standpoint, is the elimination of reflective coatings from the interior surface of the CPC. This is because light which is incident on the interior of the CPC and within the collection angle, is reflected via total internal reflection (TIR). When light is propagating within a medium of a certain refractive index and strikes a boundary to a medium of a lower refractive index, total reflection will occur if the angle of incidence is less than the critical angle. This is a figure that is also determined by Snall's Law. In this case, incident ray 206 reflects from the interior wall of the CPC at a much higher efficiency (approaching 100%) than that of the CPC of FIG. 1 where typical aluminum reflectivities are on the order of 92%. Another requirement of TIR is that the surfaces be optically smooth, to less than a fraction of a wavelength.

Unfortunately this phenomena also applies to light which strikes the exit aperture. Thus, a fraction of the rays incident on the exit aperture may be reflected back due to TIR. This Is Illustrated in FIG. 2 of the drawings where incident ray 202 strikes the exit aperture at a fairly high angle of incidence and therefore propagates through with minimum reflection, whereas incident ray 206 strikes the exit aperture at an angle which is below the critical angle and is thus reflected as ray 208. It will be appreciated that any gains in collection angle are lost at least in part, due to TIR induced reflections from the exit aperture.

Figure 3:
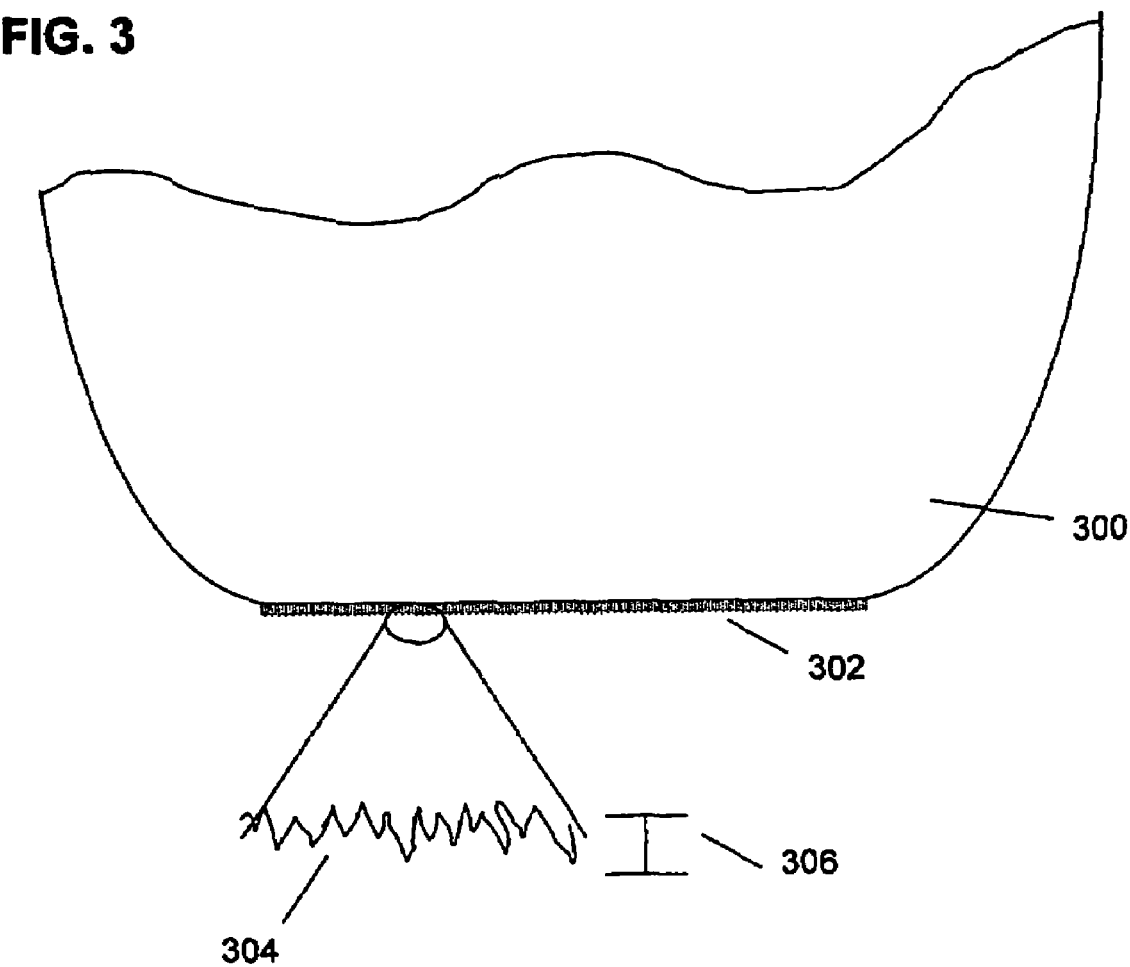
FIG. 3 of the drawings shows a CPC design that uses a material with a refractive index of >1 and a surface treatment on the exit aperture, in accordance with one embodiment of the invention.
Figure 3:
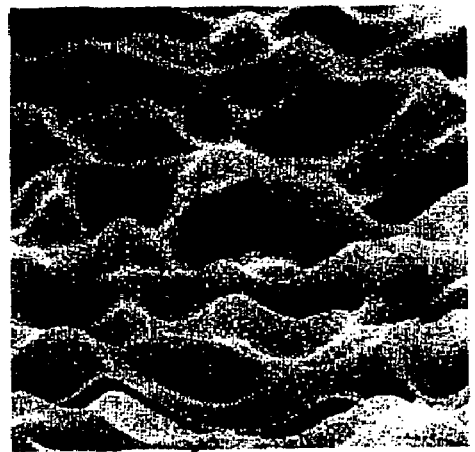
Figure 3:
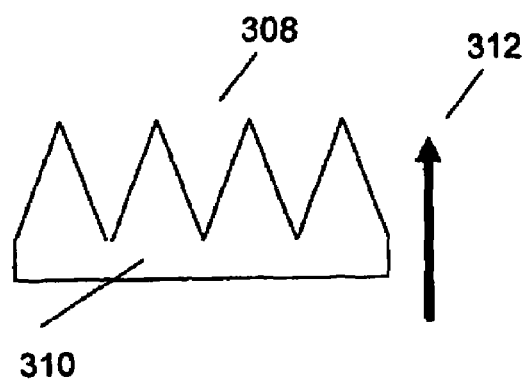

Referring to FIG. 3, an alternative dielectric CPC design is shown. The CPC 300, like the CPC 200 of FIG. 2, is made from a transparent dielectric. However in the example of FIG. 3, the surface of the exit aperture has been treated or adapted to promote transmission therethrough and to at least reduce TIR. Specifically, the surface has been roughened as shown by magnification 304. An irregular pattern has been etched or deposited on the surface resulting in a surface roughness that is random, and has a amplitude that is approximately anywhere from 1/10 a wavelength to several microns. If the amplitude of the surface roughness is too high, too much backward scattering may result. The consequence of this surface treatment is that one of the requirements for TIR, an optically smooth surface, has been defeated. Thus, light striking the surface at an angle below the critical angle will propagate through. Scanning electron micrograph image 306, shows an image of a surface treated as described-above.

In another embodiment, in order to promote transmission through the exit aperture, the surface of the CPC at the exit aperture may be etched in a way such that the average index of refraction changes gradually from that of CPC dielectric, to that of air as the light moves outward through the exit aperture. Material 310, is shown with an etch pattern such that as light propagates in the direction indicated by arrow 312, the average Index of refraction decreases gradually to that of the surrounding air 308.

Such treatments can be achieved using a variety of techniques. For etching these include the exposure to a variety of acids or alkaline solutions in the case of glass or plastic based materials, respectively. Exposure to oxygen based plasmas with or without prior wet etching may provide such surfaces in the case of plastic based materials. From a deposition standpoint, the goal Is to deposit on the surface a layer of material that achieves the same degree of roughness but is optically compatible. Solvents containing dissolved aggregates of particles of metallic oxide particles, plastic, or other transparent dielectrics may be suitable. In this case, the solvent is applied to the surface in a uniform fashion (spin application or dip coating for example) and then allowed to evaporate, leaving behind the suitably roughened surface. A combination of deposition, to form a random particle mask, and etching, to impart that pattern into the material, may also work.

In one embodiment, the treatment 302 is replaced by a continuous dielectric coating in the form of a single or multilayer thin film stack which can act as an antireflection coating. Many designs exist for such coatings with varying degrees of effectiveness and those familiar with the art have a wide variety of materials and design tools for realizing them. A single layer film design could, for example, be comprised of a film whose thickness is an odd multiple of a quarter wavelength of light, and whose index is the square root (or close approximation) of that of the CPC material. Magnesium fluoride is one example of a useful material.

Figure 4:
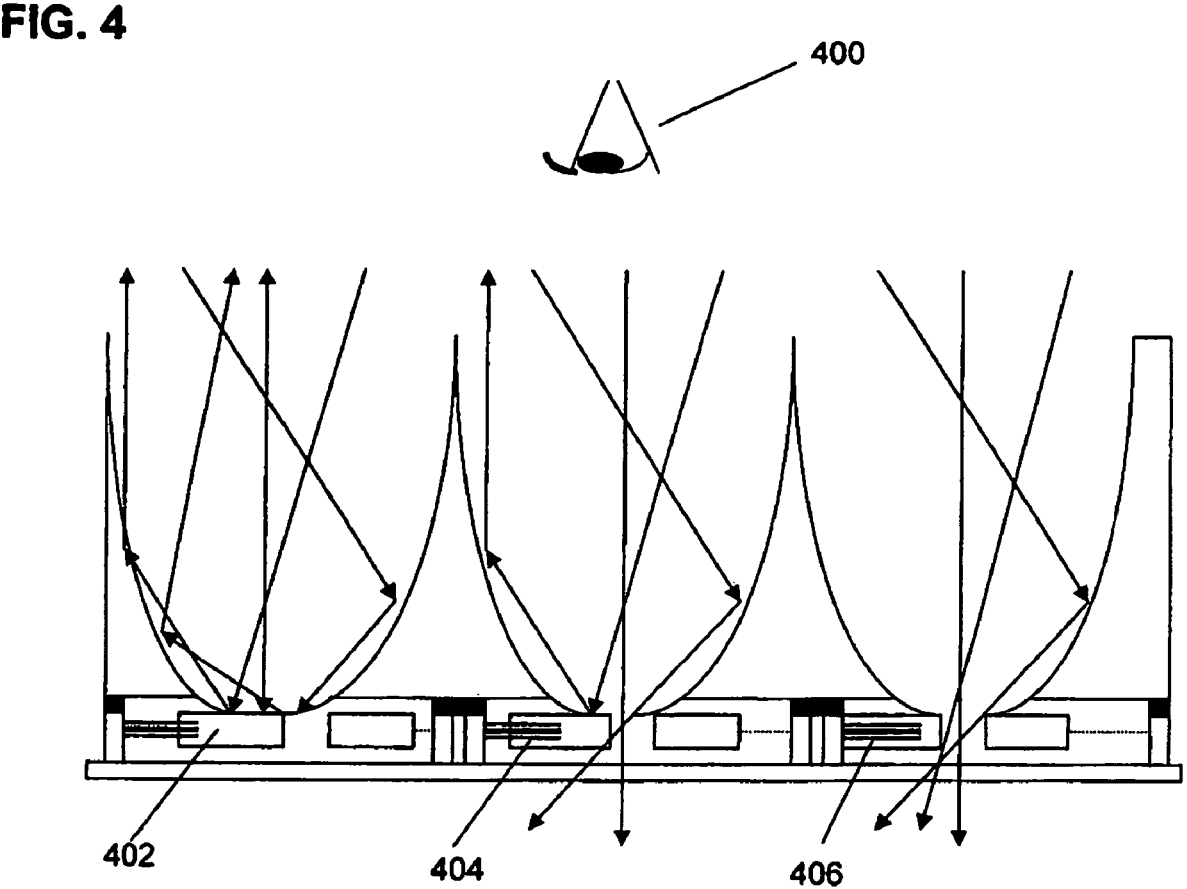
FIG. 4 of the drawings shows an example of a lateral actuating mechanical shutter integrated with a concentrating non-imaging optic.

Referring to FIG. 4 of the drawings, a micromechanical shutter array integrated with a CPC array is shown. Operation of the shutter array has been described in U.S. Patent Application Number U.S. 60/659,498, which is hereby incorporated by reference. As will be seen, reflective shutters 402, 404, and 406 are shown in three states of actuation. Shutter is 402 is positioned to reflect the maximum amount of light to viewer 400, shutter 404 reflects half of the light and shutter 406 reflects none of the light. The way in which such a shutter optically interacts with the CPC is determined by the nature of the CPC design as discussed above. For air filled CPC designs, this interaction Is fairly straightforward. The only real constraint in maximizing the amount of light which Is reflected when the shutter fully obstructs the aperture is to minimize the distance between the shutter and the aperture. Thus, the amount of light that escapes at the edges or the boundary is minimized.

Figure 5:
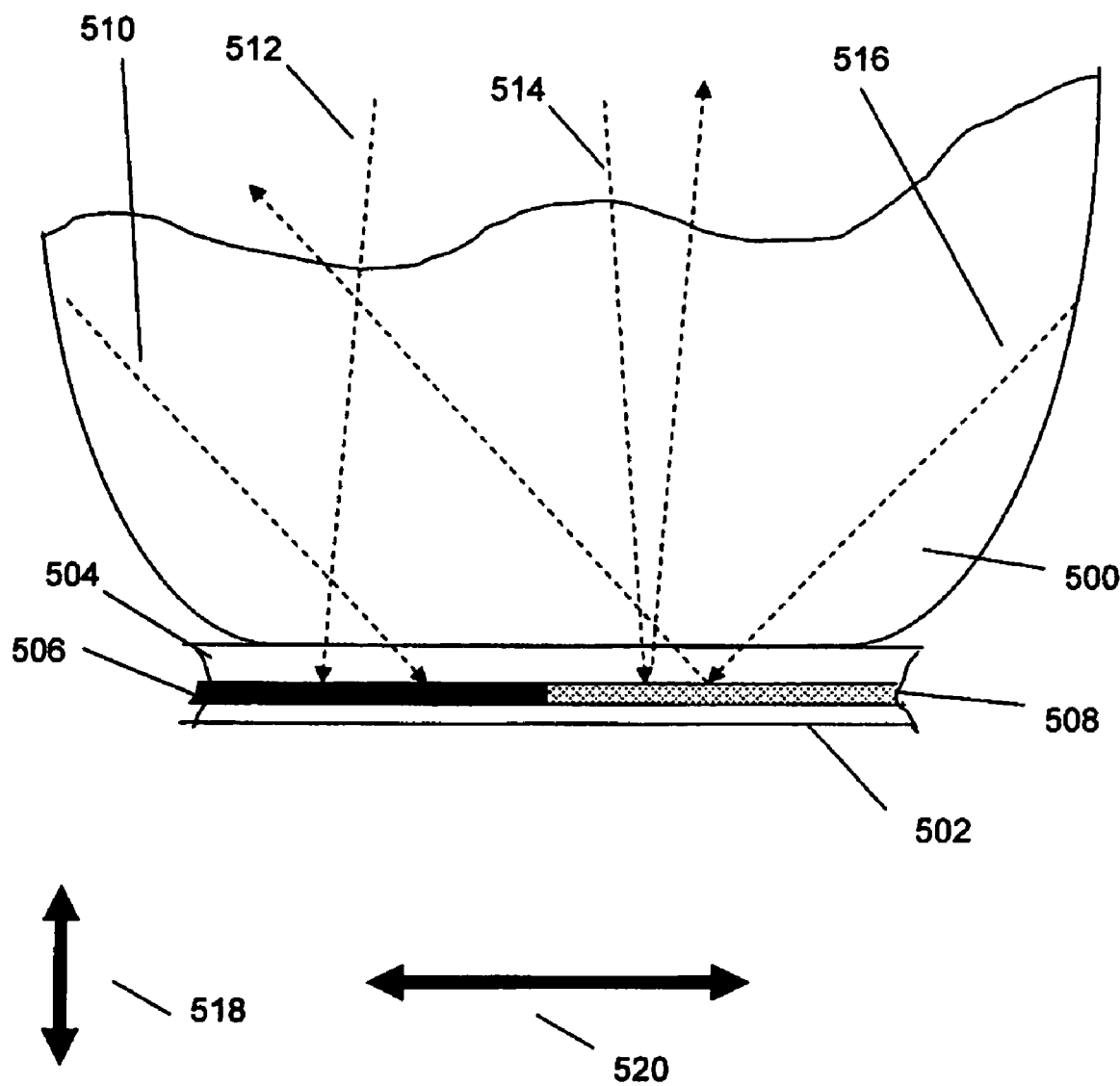
FIG. 5 of the drawings shows a light modulator which includes a CPC which can be optically coupled to a shutter; in accordance with one embodiment of the invention.

Dielectric CPCs present a more complicated design problem. Referring to FIG. 5, dielectric CPC 500 is shown optically coupled to shutter 502 which is in a half brightness position. The CPC 500, does not have any surface treatment or coatings on its exit aperture. Shutter 502 has absorbing region 506 deposited adjacent to reflecting region 508. The former might comprise carbon black particles suspended in a polymer matrix, though multilayer thin film stacks are possible.

The reflecting region may just be a transparent polymer which relies on the inherent reflectivity of the shutter material though it could be a reflecting metal (silver or aluminum for example) Itself. Optional index matching layer 504, Is positioned to decrease reflections which may occur due to difference in the refractive index between the CPC material and the shutter materials.

For proper operation of this shutter CPC combination, the shutter must be in intimate physical and therefore optical contact with the CPC when in active mode. The consequence of this is that all incident rays are able to impinge upon the shutter regardless of whether they are close to normal incidence. Ray 512 arrives at an angle close to normal incidence. In the case of ray 510, the light is below the critical angle however there is effectively no discontinuity between the CPC materials and the absorber, therefore TIR does not result Without intimate contact, the incident rays would "see" the low index air at the exit aperture and TIR would be in effect.

This design is complicated by the fact that the shutter must move away from the CPC in a direction indicated by 518, before it can be repositioned along the direction 520, to alter the light reflecting characteristics of the CPC/shutter combination. Thus, the shutter must be displaced from the CPC, repositioned, and then moved back into intimate contact. A time consuming process which also makes for a more elaborate shutter design.

There is some leeway in the definition of intimate contact. In general, for optical coupling to result, the shutter materials must be within the evanescent wave which is generated at the surface of the exit aperture when TIR rays are incident. This region is within 0.5 microns of the surface. The accurate maintenance of this distance, however, may be difficult during operation.

Figure 6:
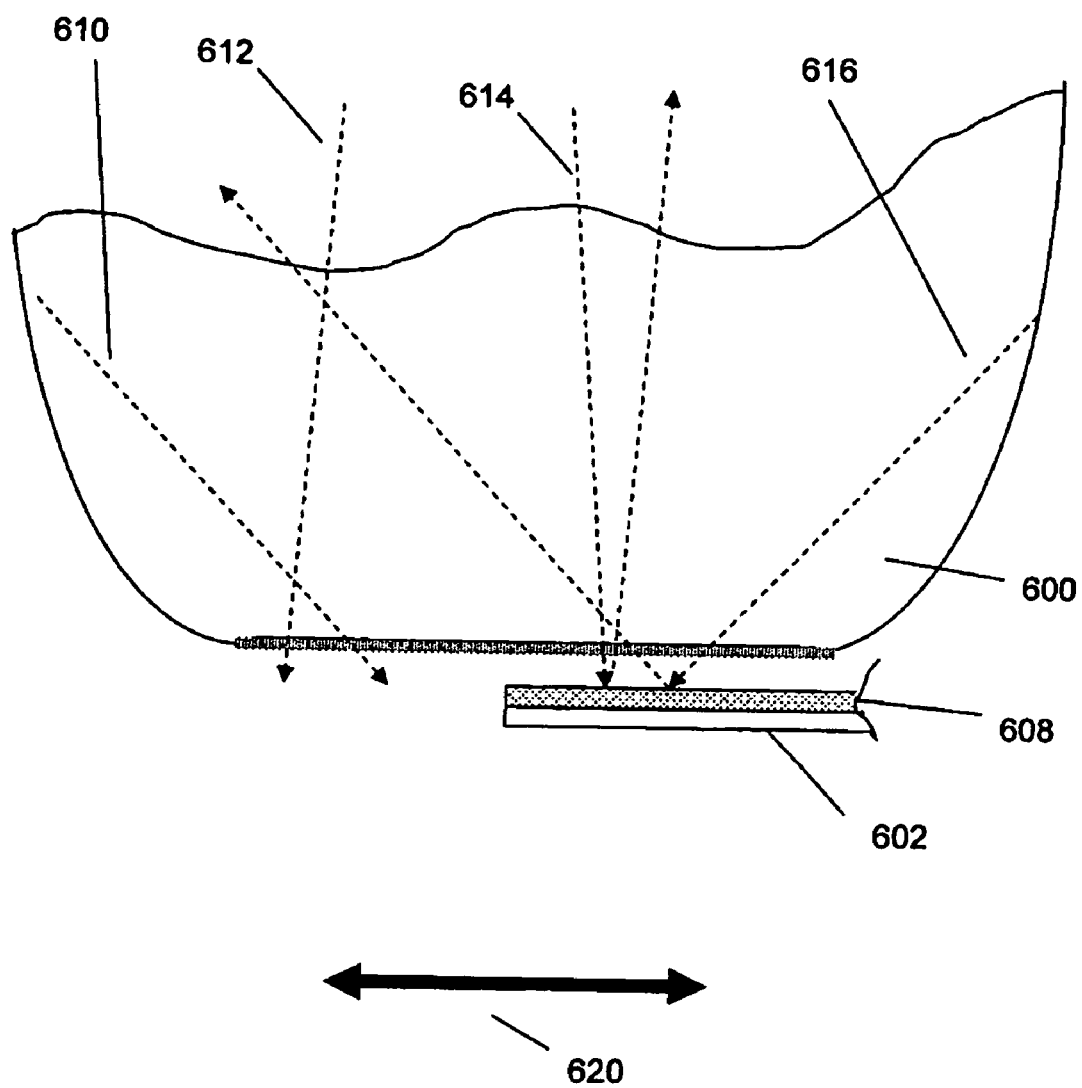
FIG. 6 of the drawings shows a light modulator which includes a CPC with and exit aperture adapted to transmit light, and a shutter that can be aligned with the exit aperture, in accordance with one embodiment of the invention.

Referring to FIG. 6 of the drawings, a dielectric CPC 600, is shown with a light extraction coating or treatment (as described above) on its exit aperture. Because all light rays, 610, 612, 614, and 616, freely exit the aperture the shutter no longer needs to be in intimate contact with the CPC during operation. The same constraints as those applied in the air filled CPC now apply here. Additionally the shutter design is simplified by the fact that no absorbing component is required. Light which is not to be reflected is simply passed through.

The invention claimed is:

1. A method, comprising:
   collecting light through a wide first end of a non-imaging concentrating optic designed to direct the light towards a narrow second end defining a boundary through which the directed light exits the non-imaging concentrating optic if said directed light is incident on the boundary at an angle less than a critical angle associated with the boundary;
   increasing transmission of the directed light through the boundary to include directed light incident on the boundary at an angle greater than the critical angle; and
   selectively positioning a shutter component in and out of alignment with the boundary; wherein when aligned with the exit aperture the light transmitted through the exit aperture impinges on the shutter component,
   wherein increasing the transmission of the directed light through the boundary comprises positioning the shutter relative to the boundary to enable coupling with an evanescent wave generated at the boundary.

2. The method of claim 1, wherein positioning the shutter comprises positioning the shutter to be in contact with the boundary.

3. The method of claim 1, wherein the shutter is within 0.5 microns of the boundary.

4. The method of claim 1, wherein increasing the transmission of the directed light through the boundary comprises roughening the boundary.

5. The method of claim 1, wherein roughening the boundary comprises fabricating structures on the boundary in an irregular pattern.

6. The method of claim 1, further comprising applying an anti-reflection coating to the boundary.

7. The method of claim 6, wherein the anti-reflection coating is defined by a multilayer thin film stack.

8. The method of claim 1, wherein the non-imaging concentrator body is of a dielectric material.

9. A device for modulating light, comprising:
   a non-imaging concentrating optic having a body defining a wide first end and a narrow second end, wherein light is collected through the first end and is directed towards the second end which defines a boundary; and
   a shutter component selectively displaceable into and out of alignment with the boundary; wherein when aligned with the boundary, light directed to the boundary at an angle greater that a critical angle associated with the boundary is transmitted through the boundary to impinge on the shutter component,
   wherein the transmission of the light striking the boundary at an angle greater than the critical angle is through coupling of an evanescent wave generated at the boundary.

10. The device of claim 9, wherein the body is of a dielectric.

11. The device of claim 9, wherein the shutter component is in contact with the boundary.

12. The device of claim 9, wherein the shutter component is within 0.5 microns of the boundary.

13. The device of 9, wherein the boundary is roughened.

14. The device of claim 9, wherein the further comprising an anti-reflective coating applied to the boundary.

15. the device of claim 14, wherein the anti-reflective coating is defined by a multilayer thin film stack.

* * * * *